United States Patent
Yong (10) Patent No.: US 10,007,150 B2
(45) Date of Patent: Jun. 26, 2018

(54) LIQUID CRYSTAL ALIGNMENT METHOD AND LIQUID CRYSTAL DISPLAY PANEL

(71) Applicant: Shenzhen China Star Optoelectronics Technology Co., Ltd., Shenzhen (CN)

(72) Inventor: Weina Yong, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 50 days.

(21) Appl. No.: 15/118,902

(22) PCT Filed: May 17, 2016

(86) PCT No.: PCT/CN2016/082280
§ 371 (c)(1),
(2) Date: Aug. 15, 2016

(87) PCT Pub. No.: WO2017/177503
PCT Pub. Date: Oct. 19, 2017

(65) Prior Publication Data
US 2017/0299925 A1    Oct. 19, 2017

(30) Foreign Application Priority Data

Apr. 13, 2016  (CN) .......................... 2016 1 0227283

(51) Int. Cl.
*G02F 1/1337*  (2006.01)
*G02F 1/1335*  (2006.01)
*G02F 1/1368*  (2006.01)

(52) U.S. Cl.
CPC ...... *G02F 1/133788* (2013.01); *G02F 1/1368* (2013.01); *G02F 1/133514* (2013.01);
(Continued)

(58) Field of Classification Search
CPC ... G02F 2001/133757; G02F 1/133788; G02F 1/133753; G02F 1/133514; G02F 1/133516; G02F 2001/136222; G02F 2201/52; G09G 3/2003; G09G 2300/0452; G09G 2300/0443; G09G 3/3607; G09G 3/3611; G09G 5/02; G02B 5/201; H01L 27/322;
(Continued)

(56) References Cited

U.S. PATENT DOCUMENTS 8,134,668 B2* 3/2012 Nakagawa ........ G02F 1/133753
349/124
2009/0284702 A1* 11/2009 Seo ................... G02F 1/133753
349/128
(Continued)

FOREIGN PATENT DOCUMENTS

CN    103257480 A  *  8/2013

*Primary Examiner* — Jia Pan (57) ABSTRACT

The present invention provides a liquid crystal alignment method and a liquid crystal display panel. The method comprises the steps of: coating a first alignment material layer on a TFT substrate, the first alignment material layer having a plurality of first regions; coating a second alignment material layer on a CF substrate, the second alignment material layer having a plurality of second regions; and utilizing the length of each first region along the row direction as an exposing width and performing an exposing alignment procedure with the exposing width to each first region to form a first alignment layer at the side of the TFT substrate.

9 Claims, 5 Drawing Sheets

(52) U.S. Cl.
CPC .. *G02F 1/133723* (2013.01); *G02F 1/133753* (2013.01); *G02F 2001/133757* (2013.01); *G02F 2201/40* (2013.01); *G02F 2201/52* (2013.01)

(58) Field of Classification Search
CPC ............. H01L 27/3213; H01L 27/3218; H01L 27/3211
See application file for complete search history.

(56) References Cited

U.S. PATENT DOCUMENTS

| | | | |
|---|---|---|---|
| 2010/0118246 A1* | 5/2010 | Nakagawa | G02F 1/133753 349/129 |
| 2010/0157220 A1* | 6/2010 | Shin | G02F 1/133707 349/123 |
| 2010/0157223 A1* | 6/2010 | Shin | G02F 1/133753 349/129 |

* cited by examiner

LIQUID CRYSTAL ALIGNMENT METHOD AND LIQUID CRYSTAL DISPLAY PANEL

RELATED APPLICATIONS

This application is a National Phase of PCT Patent Application No. PCT/CN2016/082280 having International filing date of May 17, 2016, which claims the benefit of priority of Chinese Patent Application No. 201610227283.2 filed on Apr. 13, 2016. The contents of the above applications are all incorporated by reference as if fully set forth herein in their entirety.

FIELD AND BACKGROUND OF THE INVENTION

The present invention relates to a display technology, and more particularly, to a liquid crystal alignment method and a liquid crystal display panel.

In the TFT-LCD manufacture, there are two alignment approaches, that is, rubbing treatment and optical alignment. The rubbing treatment will cause static electricity and particle pollution. The optical alignment is a noncontact alignment technology, which utilizes linear polarized light to irradiate a light-sensitive polymer alignment film to form a pretilt angle.

The optical alignment will form a dark line pattern with a shape of 卐 or 卍, called WAN-ZI dark line pattern, in the inner of a pixel unit. The WAN-ZI dark line pattern seriously affects the aperture ratio of the pixel unit. The aperture ratio has become a bottleneck in the optical alignment technology, especially as with the increasing of PPI (Pixels per Inch).

Therefore, there is a need to improve the drawbacks in the existing skills.

SUMMARY OF THE INVENTION

The objective of present invention is to provide a liquid crystal alignment method and a liquid crystal display panel for solving the technical problem of low aperture ratio in the existing liquid crystal display panels.

To solve above problems, the technical schemes provided by the present invention are described below.

The embodiments of the present invention provides a liquid crystal alignment method, in which a liquid crystal display panel comprises a TFT (Thin Film Transistor) substrate, a CF (Color Filter) substrate, and a liquid crystal layer located between the TFT substrate and the CF substrate, the TFT substrate comprises a plurality of first pixel units distributed in a rectangular array, the CF substrate comprises a plurality of second pixel units distributed in a rectangular array, each first pixel unit faces one second pixel unit and corresponds thereto, said method comprising the steps of: a. coating a first alignment material layer on the TFT substrate, the first alignment material layer having a plurality of first regions, each first region facing one first pixel unit, wherein an orientation of the plural first regions along a row is a row direction and an orientation of the plural first regions along a column is a column direction; b. coating a second alignment material layer on the CF substrate, the second alignment material layer having a plurality of second regions, each second region facing one second pixel unit; c. utilizing the length of each first region along the row direction as an exposing width and performing an exposing alignment procedure with the exposing width to each first region to form a first alignment layer at the side of the TFT substrate, wherein a same first region has a same alignment direction and two adjacent first regions located along the row direction have opposite alignment directions; and d. utilizing the length of each second region along the column direction as an exposing width and performing an exposing alignment procedure with the exposing width to each second region to form a second alignment layer at the side of the CF substrate, wherein a same second region has a same alignment direction and two adjacent second regions located along the column direction have opposite alignment directions; wherein the alignment direction for each first region is along the column direction and the alignment direction for each second region is along the row direction.

In the liquid crystal alignment method of the present invention, the first alignment material layer is formed by coating polyimide.

In the liquid crystal alignment method of the present invention, the thickness of the first alignment material layer is 0.02 mm-0.04 mm.

In the liquid crystal alignment method of the present invention, the second alignment material layer is formed by coating polyimide.

In the liquid crystal alignment method of the present invention, the thickness of the second alignment material layer is 0.03 mm-0.04 mm.

In the liquid crystal alignment method of the present invention, in Step d, a light beam tilted 45 degrees relative to the second alignment material layer is used to irradiate in exposing.

In the liquid crystal alignment method of the present invention, in Step c, a light beam tilted 45 degrees relative to the first alignment material layer is used to irradiate in exposing.

In the liquid crystal alignment method of the present invention, both of the first pixel unit and the second pixel unit comprise a red pixel sub unit, a green pixel sub unit, a blue pixel sub unit, and a white pixel sub unit; or both of the first pixel unit and the second pixel unit comprise a red pixel sub unit, a green pixel sub unit, and a blue pixel sub unit.

The present invention further provides a liquid crystal display panel, which comprises: a TFT (Thin Film Transistor) substrate comprising a plurality of first pixel units distributed in a rectangular array; a CF (Color Filter) substrate comprising a plurality of second pixel units distributed in a rectangular array, each first pixel unit facing one second pixel unit and corresponding thereto; a liquid crystal layer located between the TFT substrate and the CF substrate; a first alignment layer disposed on the side of the TFT substrate that is facing the liquid crystal layer, the first alignment layer having a plurality of first regions, each first region facing one first pixel unit, a same first region having a same alignment direction and two adjacent first regions located along a row direction having opposite alignment directions; and a second alignment layer disposed on the side of the CF substrate that is facing the liquid crystal layer, the second alignment layer having a plurality of second regions, each second region facing one second pixel unit, a same second region having a same alignment direction and two adjacent second regions located along a column direction having opposite alignment directions; wherein the alignment direction for each first region is along the column direction and the alignment direction for each second region is along the row direction.

In the liquid crystal display panel of the present invention, both of the first alignment material layer and the second alignment layer are formed by coating polyimide.

In the present invention, the length of one pixel unit along the row direction is specified as the width in each exposure of optical alignment such that a same first region has a same alignment direction and two adjacent first regions located along the row direction have opposite alignment directions, and a same second region has a same alignment direction and two adjacent second regions located along the column direction have opposite alignment directions, thereby changing the shape of dark line pattern. In such a manner, the dark line pattern may be approximately or completely distributed over an area between two adjacent pixel units that is facing the black matrix. It is helpful for improving the aperture ratio of the liquid crystal display panel.

DESCRIPTION OF SPECIFIC EMBODIMENTS OF THE INVENTION

The following descriptions for the respective embodiments are specific embodiments capable of being implemented for illustrations of the present invention with referring to appending figures. In describing the present invention, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present invention for ease of understanding, but are not intended to limit the present invention.

In the appending drawings, units with similar structures are indicated by the same reference numbers.

Figure 1:
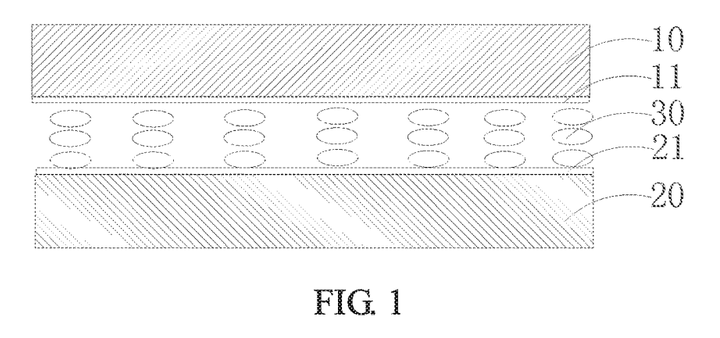
FIG. 1 is a schematic structural diagram showing a liquid crystal display panel in accordance with a preferred embodiment of the present invention.

Please refer to FIG. 1, which is a schematic structural diagram showing a liquid crystal display panel in accordance with a preferred embodiment of the present invention. The liquid crystal display panel of the present preferred embodiment includes a CF (Color Filter) substrate 10, a TFT (Thin Film Transistor) substrate 20, a liquid crystal layer 30, a first alignment layer 21, and a second alignment layer 11.

The TFT substrate 20 is similar to an array substrate in the existing skills that includes a plurality of first pixel units distributed in a rectangular array. Each first pixel unit comprises a red pixel sub unit, a green pixel sub unit, a blue pixel sub unit, and a white pixel sub unit; or each first pixel unit comprises a red pixel sub unit, a green pixel sub unit, and a blue pixel sub unit. Of course, it is not limited thereto.

The CF substrate 10 is similar to a color filter in the existing skills that includes a plurality of second pixel units distributed in a rectangular array. Each first pixel unit faces one second pixel unit and corresponds thereto. Each second pixel unit comprises a red pixel sub unit, a green pixel sub unit, a blue pixel sub unit, and a white pixel sub unit; or each second pixel unit comprises a red pixel sub unit, a green pixel sub unit, and a blue pixel sub unit.

The liquid crystal layer 30 is located between the TFT substrate 20 and the CF substrate 10. The liquid crystal layer 30 has a plurality of liquid crystal molecules disposed therein.

The first alignment layer 21 is disposed on the side of the TFT substrate 20 that is facing the liquid crystal layer 30. The first alignment layer 21 has a plurality of first regions. Each first region is facing one first pixel unit. A same first region having a same alignment direction and two adjacent first regions located along a row direction having opposite alignment directions.

The second alignment layer 11 is disposed on the side of the CF substrate 10 that is facing the liquid crystal layer 30. The second alignment layer 11 has a plurality of second regions. Each second region is facing one second pixel unit. A same second region having a same alignment direction and two adjacent second regions located along a column direction having opposite alignment directions.

The alignment direction for each first region is along the column direction and the alignment direction for each second region is along the row direction.

Specifically, both of the first alignment material layer and the second alignment material layer are formed by coating polyimide. The thickness of the first alignment material layer may be 0.02 mm-0.04 mm. The thickness of the second alignment material layer may be 0.03 mm-0.04 mm.

In the present embodiment, the length of one pixel unit along the row direction is specified as the width in each exposure of optical alignment such that a same first region has a same alignment direction and two adjacent first regions located along the row direction have opposite alignment directions, and a same second region has a same alignment direction and two adjacent second regions located along the column direction have opposite alignment directions, thereby changing the shape of dark line pattern. In such a manner, the dark line pattern may be approximately or completely distributed over an area between two adjacent pixel units that is facing the black matrix. It is helpful for improving the aperture ratio of the liquid crystal display panel.

Figure 2:
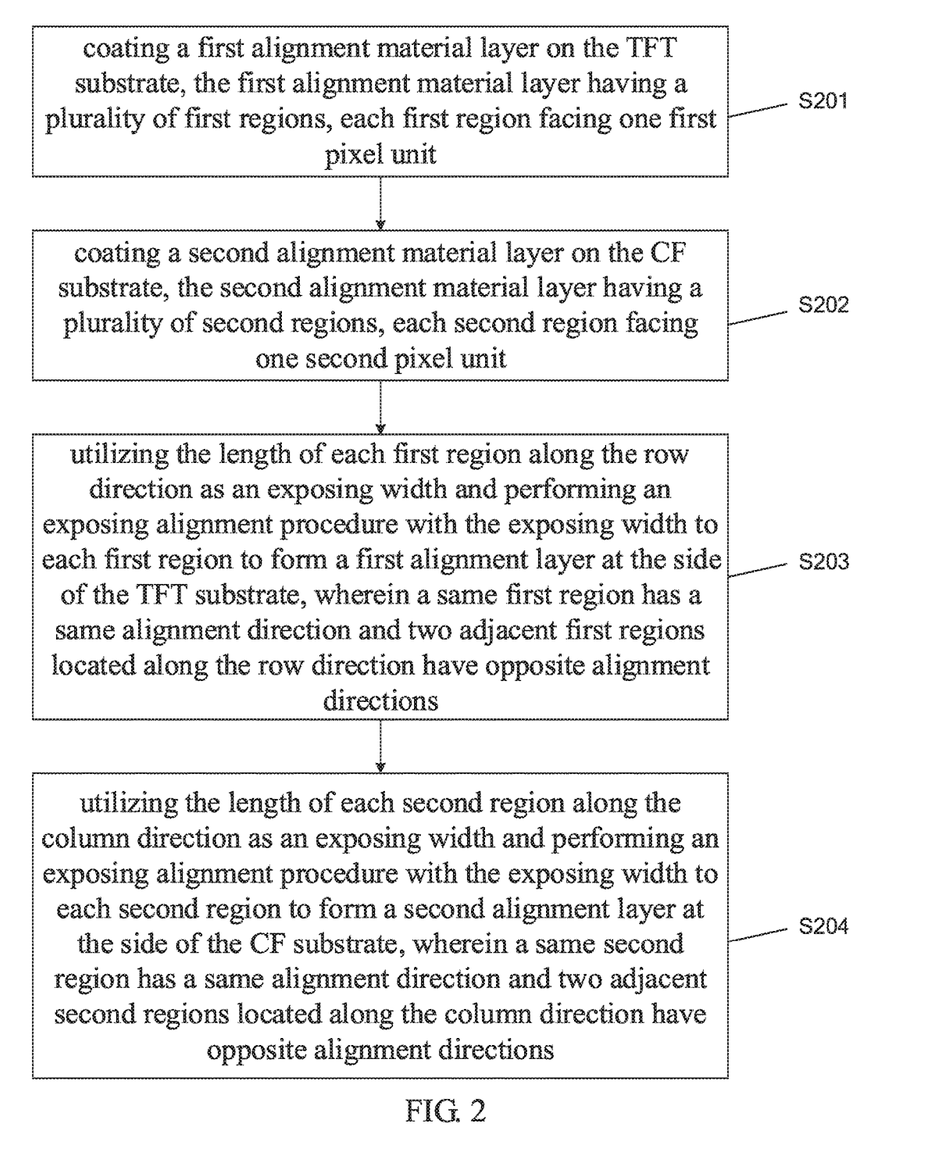
FIG. 2 is a flow chart of a liquid crystal alignment method in accordance with a preferred embodiment of the present invention.

Please refer to FIG. 2, which is a flow chart of a liquid crystal alignment method in accordance with a preferred embodiment of the present invention. First of all, a liquid crystal display panel is provided. The liquid crystal display panel comprises a TFT substrate, a CF substrate, and a liquid crystal layer located between the TFT substrate and the CF substrate. The TFT substrate comprises a plurality of first pixel units distributed in a rectangular array; the CF substrate comprises a plurality of second pixel units distributed in a rectangular array. Each first pixel unit faces one second pixel unit and corresponds thereto. The liquid crystal alignment method of the present preferred embodiment comprises the following steps.

Step S201—coating a first alignment material layer on the TFT substrate, the first alignment material layer having a plurality of first regions, each first region facing one first pixel unit, wherein an orientation of the plural first regions along a row is a row direction and an orientation of the plural first regions along a column is a column direction.

Step S202—coating a second alignment material layer on the CF substrate, the second alignment material layer having a plurality of second regions, each second region facing one second pixel unit.

Step S203—utilizing the length of each first region along the row direction as an exposing width and performing an exposing alignment procedure with the exposing width to each first region to form a first alignment layer at the side of the TFT substrate, wherein a same first region has a same alignment direction and two adjacent first regions located along the row direction have opposite alignment directions.

Step S204—utilizing the length of each second region along the column direction as an exposing width and performing an exposing alignment procedure with the exposing width to each second region to form a second alignment layer at the side of the CF substrate, wherein a same second region has a same alignment direction and two adjacent second regions located along the column direction have opposite alignment directions;

The alignment direction for each first region is along the column direction and the alignment direction for each second region is along the row direction.

Of course, the orders of Step S201 and Step S202 may be inversed as well as the orders of Step S203 and Step S204.

Each step in the liquid crystal alignment method is detailedly described below.

Figure 3:
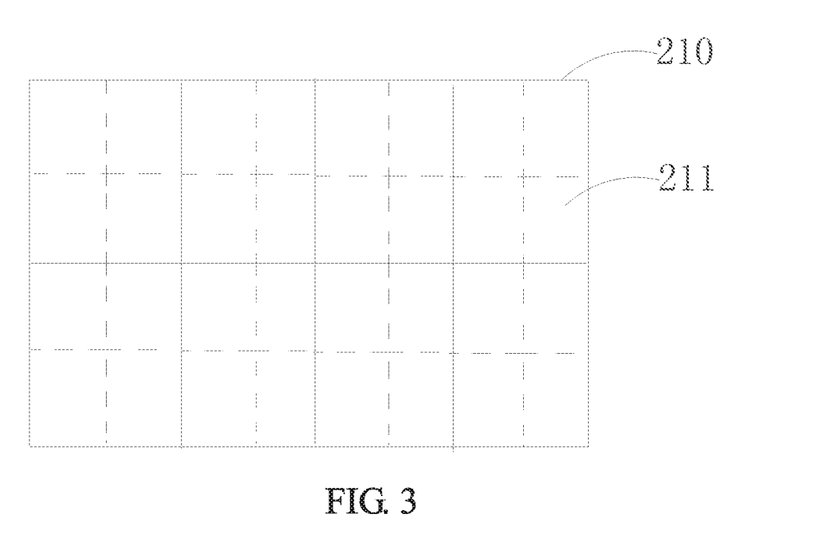
FIG. 3 is a schematic diagram showing a first alignment material layer.

In Step S201, the first alignment material layer 210 may utilize a common alignment material, for example, formed by using polyimide. The thickness of the first alignment material layer 210 may be 0.02 mm-0.04 mm. The size and shape of each first region 211 may be identical to that of the corresponding first pixel unit. The plural first regions 211 may be distributed in a rectangular matrix as the same as the plural first pixel units. An orientation of the plural first regions 211 along a row is a row direction and an orientation of the plural first regions 211 along a column is a column direction. This is illustrated in FIG. 3. The process turns to Step S202.

Figure 4:
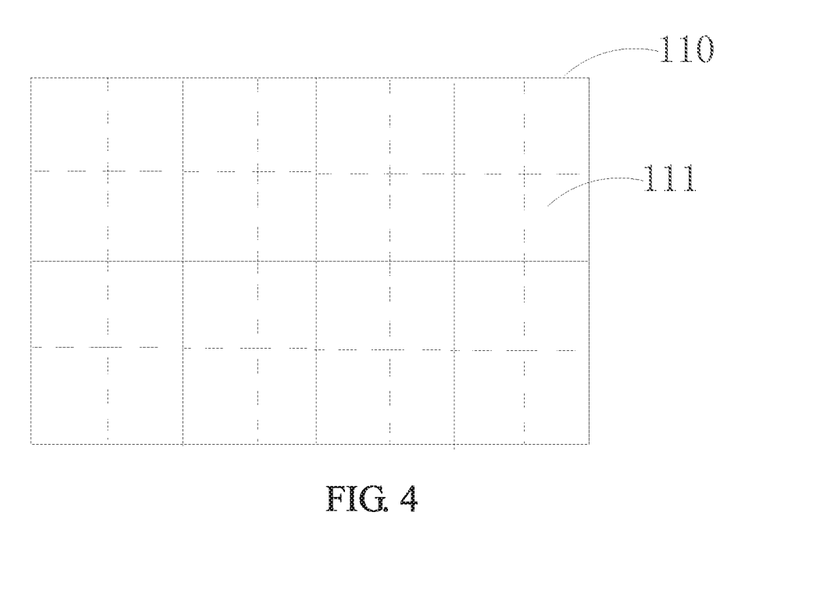
FIG. 4 is a schematic diagram showing a second alignment material layer.

In Step S202, the second alignment material layer 110 may utilize a common alignment material, for example, formed by using polyimide. The thickness of the second alignment material layer 110 may be 0.03 mm-0.04 mm. The size and shape of each second region 111 may be identical to that of the corresponding second pixel unit. The plural second regions 111 may be distributed in a rectangular matrix as the same as the plural second pixel units. This is illustrated in FIG. 4. The process turns to Step S203.

Figure 5:
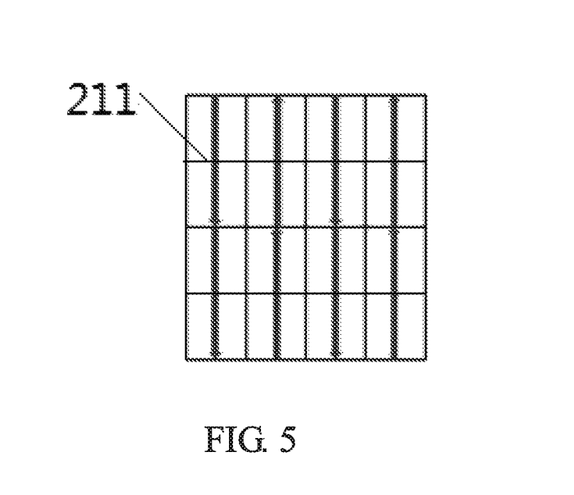
FIG. 5 is a schematic diagram showing alignment on the first alignment material layer.

In Step S203, during an exposing alignment procedure, the light beam irradiating each first region 211 is tilted 45 degrees relative to the first alignment material layer 210. Each region 211 corresponds to a light beam, of which the width is the exposing width. A same first region 211 has a same alignment direction and two adjacent first regions 211 located along the row direction have opposite alignment directions. In the present embodiment, the alignment direction for each first region 211 is along the column direction. In this step, two mask processes may be required in the exposing. In a first mask process, the plural first regions 211 are aligned or oriented along a specific direction; in a second mask process, the plural first regions 211 are aligned or oriented along another specific direction. This is illustrated in FIG. 5. The process turns to Step S204.

Figure 6:
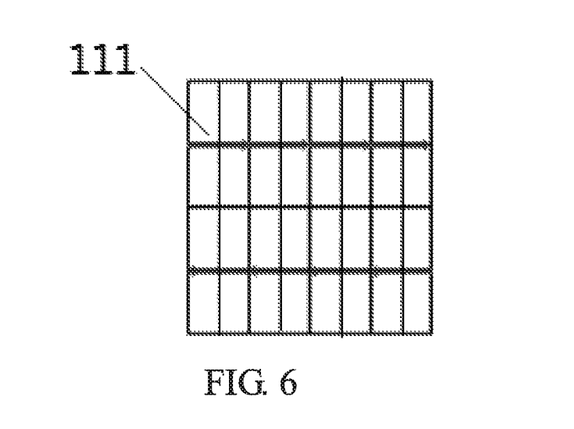
FIG. 6 is a schematic diagram showing alignment on the second alignment material layer.

In Step S204, during an exposing alignment procedure, the light beam irradiating each second region 111 is tilted 45 degrees relative to the second alignment material layer 110. Each region 111 corresponds to a light beam, of which the width is the exposing width. A same second region 111 has a same alignment direction and two adjacent second regions 111 located along the column direction have opposite alignment directions. In the present embodiment, the alignment direction for each second region 111 is along the row direction. In this step, two mask processes may be required in the exposing. In a first mask process, the plural second regions 111 are aligned or oriented along a specific direction; in a second mask process, the rest of the plural second regions 111 are aligned or oriented along another specific direction. This is illustrated in FIG. 6.

Figure 7:
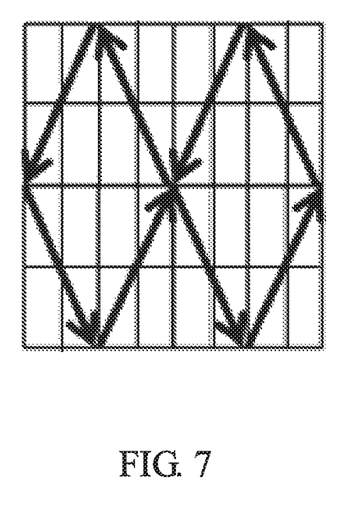
FIG. 7 is a vector multiplication diagram showing the overlapped alignment results of the first alignment material layer and the second alignment material layer.
Figure 8:
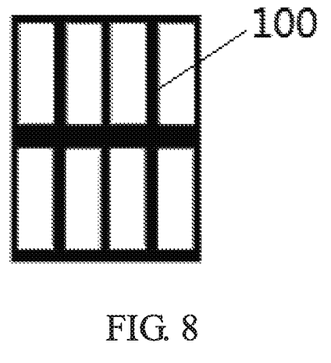
FIG. 8 is a diagram showing alignment effect as a black matrix is presented.

Once the two alignment results in Step S203 and Step S204 are overlapped, a vector multiplication diagram shown in FIG. 7 is obtained, in which the pretilt angle is equal to 45 degrees. FIG. 8 is a diagram showing the alignment effect. The dark line pattern generated in the alignment is located at a region corresponding to a black matrix 100, and therefore it does not affect the aperture ratio.

In addition, both of the first pixel unit and the second pixel unit comprise a red pixel sub unit, a green pixel sub unit, a blue pixel sub unit, and a white pixel sub unit; or both of the first pixel unit and the second pixel unit comprise a red pixel sub unit, a green pixel sub unit, and a blue pixel sub unit. Of course, it is not limited thereto.

In the present embodiment, the length of one pixel unit along the row direction is specified as the width in each exposure of optical alignment such that the shape of dark line pattern is changed. In such a manner, the dark line pattern may be approximately or completely distributed over an area between two adjacent pixel units that is facing the black matrix 100. It is helpful for improving the aperture ratio of the liquid crystal display panel.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A liquid crystal alignment method, in which a liquid crystal display panel comprises a TFT (Thin Film Transistor) substrate, a CF (Color Filter) substrate, and a liquid crystal layer located between the TFT substrate and the CF substrate, the TFT substrate comprises a plurality of first pixel units distributed in a rectangular array, the CF substrate comprises a plurality of second pixel units distributed in a rectangular array, each first pixel unit faces one second pixel unit and corresponds thereto, said method comprising the steps of:

a. coating a first alignment material layer on the TFT substrate, the first alignment material layer having a plurality of first regions, each first region facing one first pixel unit, wherein an orientation of the plural first regions along a row is a row direction and an orientation of the plural first regions along a column is a column direction;

b. coating a second alignment material layer on the CF substrate, the second alignment material layer having a plurality of second regions, each second region facing one second pixel unit;

c. utilizing the length of each first region along the row direction as an exposing width and performing an exposing alignment procedure with the exposing width to each first region to form a first alignment layer at the side of the TFT substrate, wherein a same first region has a same alignment direction and two adjacent first regions located along the row direction have opposite alignment directions; and d. utilizing the length of each second region along the column direction as an exposing width and performing an exposing alignment procedure with the exposing width to each second region to form a second alignment layer at the side of the CF substrate, wherein a same second region has a same alignment direction and two adjacent second regions located along the column direction have opposite alignment directions;

wherein the alignment direction for each first region is along the column direction and the alignment direction for each second region is along the row direction, wherein both of the first pixel unit and the second pixel unit comprise a red pixel sub unit, a green pixel sub unit, a blue pixel sub unit, and a white pixel sub unit; and wherein the red pixel sub unit, the green pixel sub unit, the blue pixel sub unit, and the white pixel sub unit are arranged as 2×2 columns and rows.

2. The liquid crystal alignment method according to claim 1, wherein the first alignment material layer is formed by coating polyimide.

3. The liquid crystal alignment method according to claim 2, wherein the thickness of the first alignment material layer is 0.02 mm-0.04 mm.

4. The liquid crystal alignment method according to claim 1, wherein the second alignment material layer is formed by coating polyimide.

5. The liquid crystal alignment method according to claim 4, wherein the thickness of the second alignment material layer is 0.03 mm-0.04 mm.

6. The liquid crystal alignment method according to claim 1, wherein in Step d, a light beam tilted 45 degrees relative to the second alignment material layer is used to irradiate in exposing.

7. The liquid crystal alignment method according to claim 1, wherein in Step c, a light beam tilted 45 degrees relative to the first alignment material layer is used to irradiate in exposing.

8. A liquid crystal display panel, comprising:

a TFT (Thin Film Transistor) substrate comprising a plurality of first pixel units distributed in a rectangular array;

a CF (Color Filter) substrate comprising a plurality of second pixel units distributed in a rectangular array, each first pixel unit facing one second pixel unit and corresponding thereto;

a liquid crystal layer located between the TFT substrate and the CF substrate;

a first alignment layer disposed on the side of the TFT substrate that is facing the liquid crystal layer, the first alignment layer having a plurality of first regions, each first region facing one first pixel unit, a same first region having a same alignment direction and two adjacent first regions located along a row direction having opposite alignment directions; and a second alignment layer disposed on the side of the CF substrate that is facing the liquid crystal layer, the second alignment layer having a plurality of second regions, each second region facing one second pixel unit, a same second region having a same alignment direction and two adjacent second regions located along a column direction having opposite alignment directions;

wherein the alignment direction for each first region is along the column direction and the alignment direction for each second region is along the row direction, wherein both of the first pixel unit and the second pixel unit comprise a red pixel sub unit, a green pixel sub unit, a blue pixel sub unit, and a white pixel sub unit; and wherein the red pixel sub unit, the green pixel sub unit, the blue pixel sub unit, and the white pixel sub unit are arranged as 2×2 columns and rows.

9. The liquid crystal display panel according to claim 8, wherein both of the first alignment layer and the second alignment layer are formed by coating polyimide.

* * * * *